(12) United States Patent
Herzer et al.

(10) Patent No.: US 8,884,599 B2
(45) Date of Patent: Nov. 11, 2014

(54) SWITCHING CONVERTER CONTROL CIRCUIT

(75) Inventors: Stefan Herzer, Illmenau (DE); Sumeet P. Kulkarni, Munich (DE); Jochen Neidhardt, Munich (DE)

(73) Assignee: Texas Instruments Deutschland GmbH, Freising (DE)

( * ) Notice: Subject to any disclaimer, the term of this patent is extended or adjusted under 35 U.S.C. 154(b) by 181 days.

(21) Appl. No.: 13/052,240

(22) Filed: Mar. 21, 2011

(65) Prior Publication Data

US 2011/0241633 A1   Oct. 6, 2011

(30) Foreign Application Priority Data

Mar. 30, 2010  (DE) .......................... 10 2010 013 353

(51) Int. Cl.
G05F 1/00 (2006.01)
H02M 3/158 (2006.01)
H02M 3/157 (2006.01)

(52) U.S. Cl.
CPC ............ *H02M 3/157* (2013.01); *H02M 3/1588* (2013.01); *Y02B 70/1466* (2013.01)
USPC ............................ 323/284; 323/282; 323/283

(58) Field of Classification Search
USPC .................................. 323/271, 235, 281–285
See application file for complete search history.

(56) References Cited

U.S. PATENT DOCUMENTS

| 6,643,145 | B1 | 11/2003 | Harrison | |
| 7,633,278 | B2* | 12/2009 | Ohtake | 323/282 |
| 7,652,461 | B2* | 1/2010 | Tateishi | 323/284 |
| 7,652,945 | B2* | 1/2010 | Chu et al. | 365/226 |
| 7,714,556 | B2* | 5/2010 | Chu et al. | 323/282 |
| 7,741,983 | B1* | 6/2010 | Lakshmikanthan et al. | 341/120 |
| 7,940,596 | B2* | 5/2011 | Chu et al. | 365/226 |
| 8,125,203 | B2* | 2/2012 | Ayukawa et al. | 323/272 |
| 8,253,398 | B2* | 8/2012 | Nakamura et al. | 323/271 |
| 8,513,933 | B2* | 8/2013 | Notman et al. | 323/284 |
| 2004/0036459 | A1 | 2/2004 | Wiktor et al. | |
| 2004/0095121 | A1* | 5/2004 | Kernahan et al. | 323/283 |
| 2008/0157894 | A1* | 7/2008 | Hariton et al. | 332/109 |
| 2008/0203997 | A1* | 8/2008 | Foran et al. | 324/76.11 |
| 2009/0091308 | A1 | 4/2009 | Omi | |

OTHER PUBLICATIONS

DE Search Report dated Jan. 24, 2011.

* cited by examiner

*Primary Examiner* — Matthew Nguyen
*Assistant Examiner* — Henry Lee, III
(74) *Attorney, Agent, or Firm* — William B. Kempler; Frederick J. Telecky, Jr.

(57) ABSTRACT

A DC-DC converter has a control circuit for controlling a high-side power transistor and a low-side power transistor connected in series between supply terminals to which an input supply voltage is applied. The converter has a switching node at the interconnection of the power transistors for connection of an inductor to which a load is connected. The control circuit has a feedback loop that provides a pulse width modulated control signal, logic circuitry to which the pulse width modulated control signal is applied and gate drivers with inputs connected to outputs of the logic circuitry and outputs applying gate drive signals to the gates of the power transistors. A digital signal is obtained which is indicative of whether the converter switching node is at a potential above or below a zero reference at the time of the turn-off edge of the low-side gate drive signal. The turn-off edge of the low-side gate drive signal is advanced or delayed by a predetermined amount in response to the value of the digital signal.

18 Claims, 8 Drawing Sheets

SWITCHING CONVERTER CONTROL CIRCUIT

CROSS-REFERENCE TO RELATED APPLICATIONS

This application is claims priority from German Patent Application No. 10 2010 013 353.1, filed Mar. 30, 2010, which is hereby incorporated by reference for all purposes.

FIELD OF THE INVENTION

The invention relates to a DC-DC converter control circuit for controlling the high-side and low-side power transistors connected in series between supply terminals.

BACKGROUND OF THE INVENTION

A typical DC-DC converter has a high-side power transistor and a low-side power transistor connected in series between supply terminals, and an external inductor connected between the interconnection node of the power transistors, usually referred to as the switch node, and an output terminal to which a load is connected. The low-side transistor acts as a synchronous rectifier to improve efficiency compared to solutions with a rectifier diode by eliminating the voltage drop across the diode and replacing it with a small voltage drop of a low resistance transistor switch. While this solution is very effective at high load currents, a problem at low load current is that the inductor current reverses and will not be blocked naturally by reverse biasing of a diode. This results in a power loss in the synchronous rectifier, reducing efficiency at low load current. To address this problem, it is necessary to detect the reversal of inductor current and turn off the low-side transistor at the right time before such current reversal can occur. One way to determine the right time for the turn-off edge of the low-side gate drive signal is to detect the zero-crossing of the inductor current using a comparator. However, a low-offset high speed comparator is needed for this approach. This is especially critical when efficiency is important and a low-resistance low-side FET is used as synchronous rectifier. At low load current, the voltage drop across the transistor is extremely small, typically in a single-digit mV range, making exorbitant demands on the comparator in terms of accuracy and speed.

SUMMARY OF THE INVENTION

In one aspect of the invention a DC-DC converter control circuit is provided for controlling a high-side power transistor and a low-side power transistor connected in series between supply terminals to which an input supply voltage is applied. The converter has a switching node at the interconnection of the power transistors for connection of an inductor to which a load is connected. The control circuit is typically an integrated circuit whereas the power transistors and the inductor may be external elements of the converter. The control circuit has a feedback loop that provides a pulse width modulated control signal, the frequency of which is determined by a clock signal and the duty cycle of which varies with the load current. The control circuit further has logic circuitry to which the pulse width modulated control signal is applied and gate drivers with inputs connected to outputs of the logic circuitry and outputs applying gate drive signals to the gates of the power transistors. In addition, the control circuit further comprises digital detection circuitry providing a digital signal indicative of whether the converter switching node is at a potential above or below a zero reference at the time of the turn-off edge of one of the gate drive signals; and adjusting circuitry controlled by the digital signal to advance or delay the turn-off edge of the gate drive signal by a predetermined amount in response to the value of the digital signal. In case of a buck converter the gate drive signal is the low-side gate drive signal. In case of a boost converter the gate drive signal is the high-side gate drive signal.

In another aspect of the invention a method of controlling a DC-DC buck converter is provided, using a control circuit for controlling a high-side power transistor and a low-side power transistor connected in series between supply terminals to which an input supply voltage is applied. The converter has a switching node at the interconnection of the power transistors for connection of an inductor to which a load is connected. The control circuit has a feedback loop that provides a pulse width modulated control signal, logic circuitry to which the pulse width modulated control signal is applied and gate drivers with inputs connected to outputs of the logic circuitry and outputs applying gate drive signals to the gates of the power transistors. The inventive method includes two steps. In a first step, a digital signal is obtained which is indicative of whether the converter switching node is at a potential above or below a zero reference at the time of the turn-off edge of the low-side gate drive signal. In a second step, the turn-off edge of the low-side gate drive signal is advanced or delayed by a predetermined amount in response to the value of the digital signal.

A DC-DC converter with one aspect of the inventive control circuit does not need a very low offset and high speed comparator. Only a less accurate helper comparator is needed with reduced requirements of silicon area on the chip since the comparator monitors a large high or low excursion on the switching node following the low-side transistor turn-off and the turn-off instant for the low-side transistor is generated digitally. The digital control logic knows exactly when inductor current reversal occurs with respect to the switching period and is not sensitive to the presence of noise. Hence, it is easy to calibrate digitally how deep the load current has to fall for entering a low power mode.

It should be understood that in case of a boost converter it is the high-side gate drive signal that is monitored instead of the low-side gate drive signal.

BRIEF DESCRIPTION OF DRAWINGS

Further aspects of the invention will appear from the appending claims and from the following detailed description given with reference to the appending drawings.

DETAILED DESCRIPTION OF AN EXAMPLE EMBODIMENT

The example embodiment disclosed is a buck converter, it being understood that the principles of the invention are applicable generally to switched mode power supplies and, of course, to boost converters, with only minor modifications.

Figure 1:
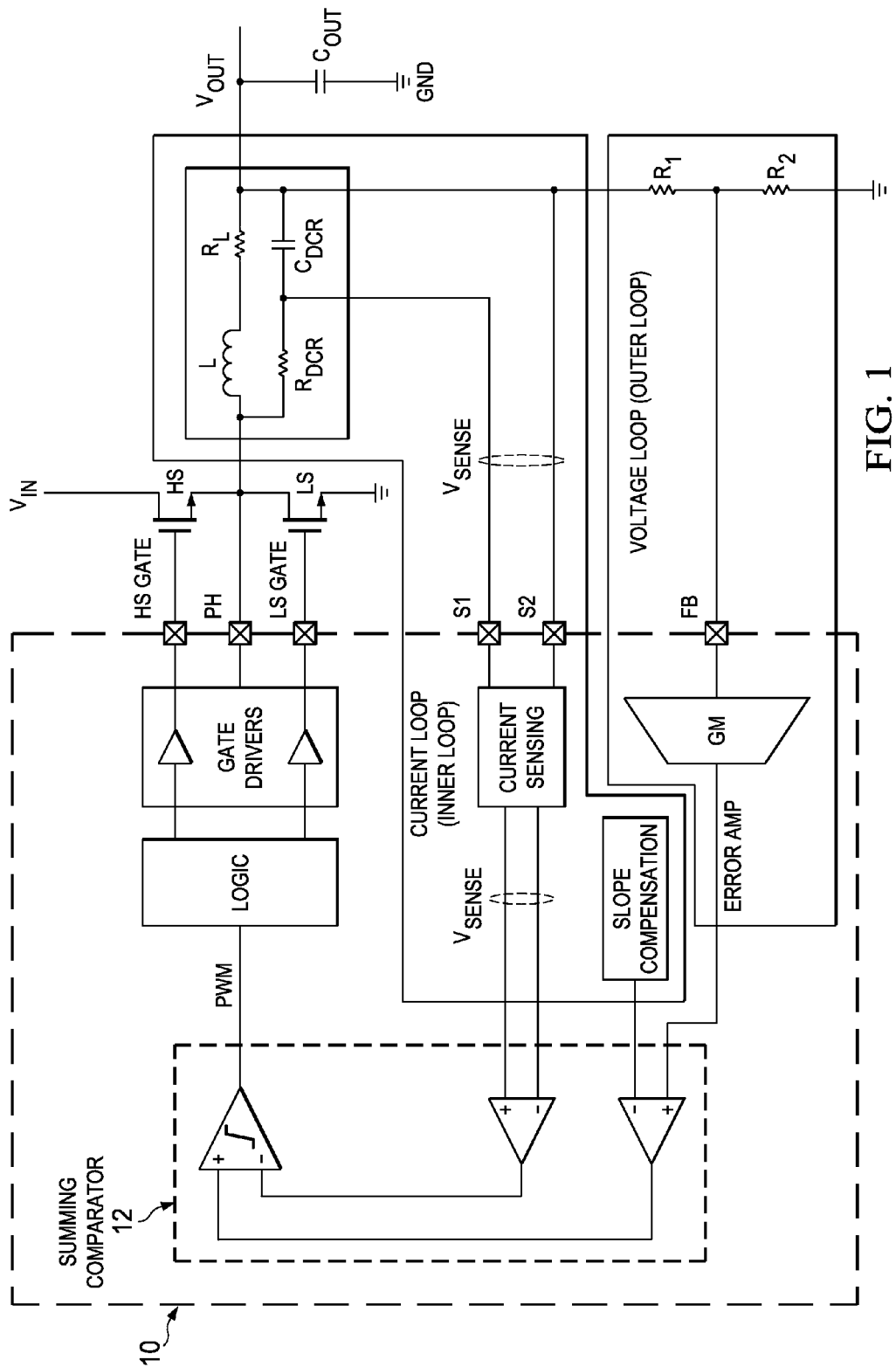
FIG. 1 is a schematic block diagram illustrating the general constitution of a DC-DC converter.

In FIG. 1, block 10 is an integrated control circuit incorporating the control logic and gate drivers for external power MOSFET transistors, high-side transistor HS and low-side transistor LS, connected in series between supply terminal $V_{IN}$ and ground GND. The interconnection node PH of both transistors, the converter's switching node, is connected to the converter's output $V_{OUT}$ through an inductor L as is conventional. Also shown is a parasitic resistive component RL of the inductor. The output $V_{OUT}$ is buffered with a capacitor $C_{OUT}$ as usual. The control circuit includes analog control circuitry in a block 12 with a summing comparator that provides a pulse width modulated signal PWM to the control logic and inputs from a current sensing circuit and from a feedback loop. The current sensing circuit is connected to terminals S1 and S2 to which a current sensing signal VSENSE is applied from an RC series combination $R_{DCR}$ and $C_{DCR}$ connected across inductor L. The feedback loop includes an error amplifier with an input connected to feedback terminal FB to which a fraction of the output voltage $V_{OUT}$ is applied as derived from a resistive divider R1, R2.

Figure 2:
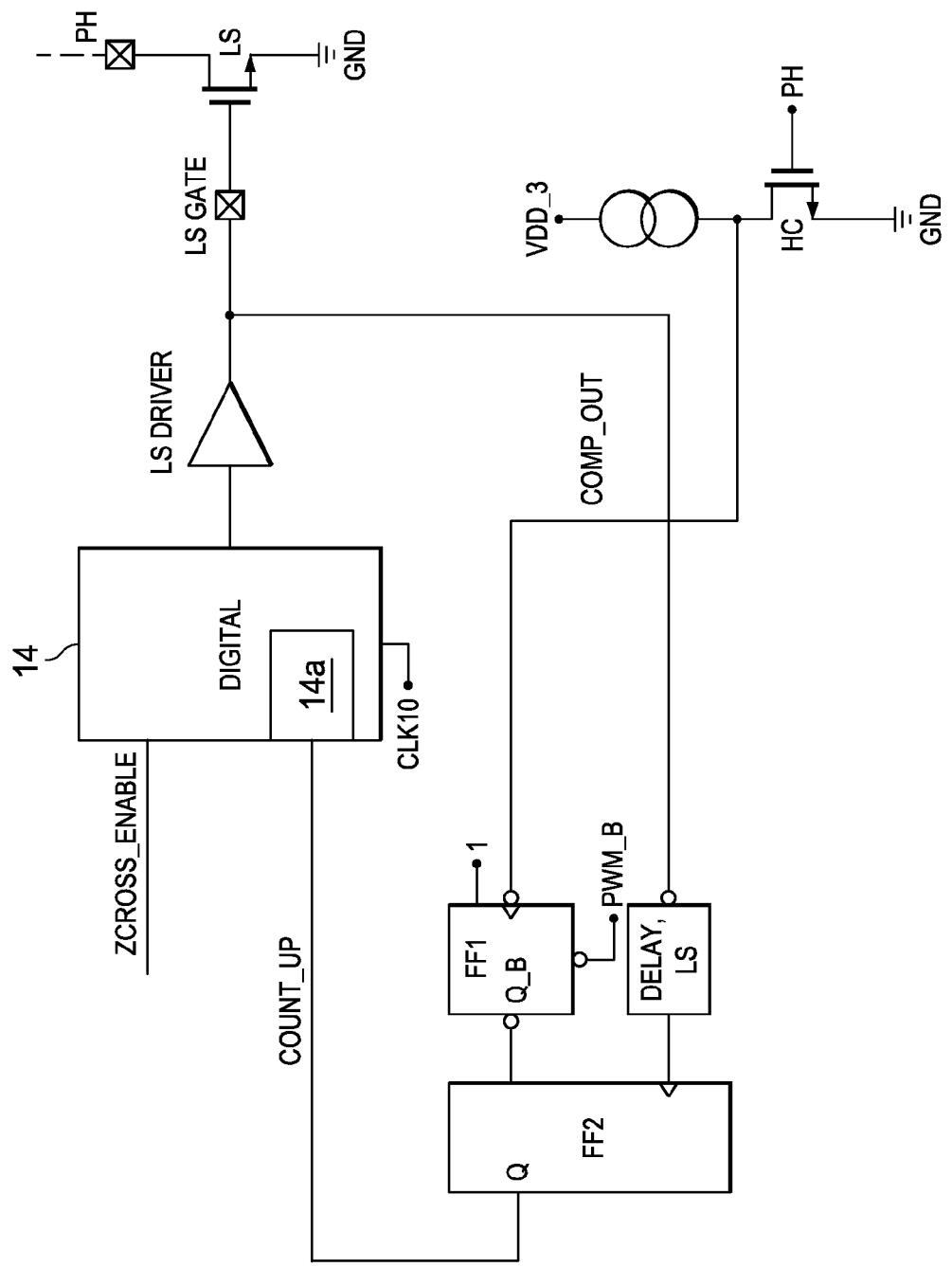
FIG. 2 is a partial block diagram of a control circuit for use in the DC-DC converter.

FIG. 2 shows only a part of the control circuit which is concerned with driving the low-side transistor LS. The purpose is determining the optimum time for the turn-off edge of the low-side transistor LS within the periods of the PWM signal.

Digital circuitry 14 in FIG. 2 is clocked from the system clock CLK10 from which the converter clock for the PWM signal is derived, and has an output that controls the low-side gate driver LS DRIVER which in turn drives the gate of low-side transistor LS at terminal LSGATE. A "helper" comparator is implemented with a transistor HC which has its gate connected to the switching node PH, its drain connected to a supply source VDD_3 and its source connected to ground. The output of the comparator at the drain of transistor HC is applied to the low-active clock input of a flip-flop FF1 the data input of which is fixedly tied to "high" or digital "1". Flip-flop FF1 has its low-active reset input connected to the PWM output of block 12 (FIG. 1) and its inverting output Q_B applied to the data input of a second flip-flop FF2. The second flip-flop FF2 receives a clock input from a delay element DELAY,LS to the inverting input of which the output of LS DRIVER is applied. Flip-flop FF2 in fact samples the output of flip-flop FF1 at a time slightly delayed with respect to the falling edge of the LS DRIVER output. The output of flip-flop FF2 is a signal COUNT_UP applied to an input of digital circuitry 14, s will be further explained with reference to FIG. 3. Since the COUNT_UP signal comes from analog circuitry, it is asynchronous with respect to the system clock CLK10. It is therefore necessary to synchronize the COUNT_UP signal with the system clock CLK10, which is achieved with a synchronizer 14*a* implemented e.g. with flip-flops that sample the signal COUNT_UP with clock CLK10.

A further input to digital circuitry 14 is a signal ZCROSS_ENABLE which is the result of an evaluation of the load current level. In fact, since the mechanism of optimizing the turn-off moment for the low-side transistor LS is intended to improve the efficiency at small load current, that mechanism is enabled by a high ZCROSS_ENABLE signal when a low load current condition is detected. However, this functionality is optional.

Figure 3:
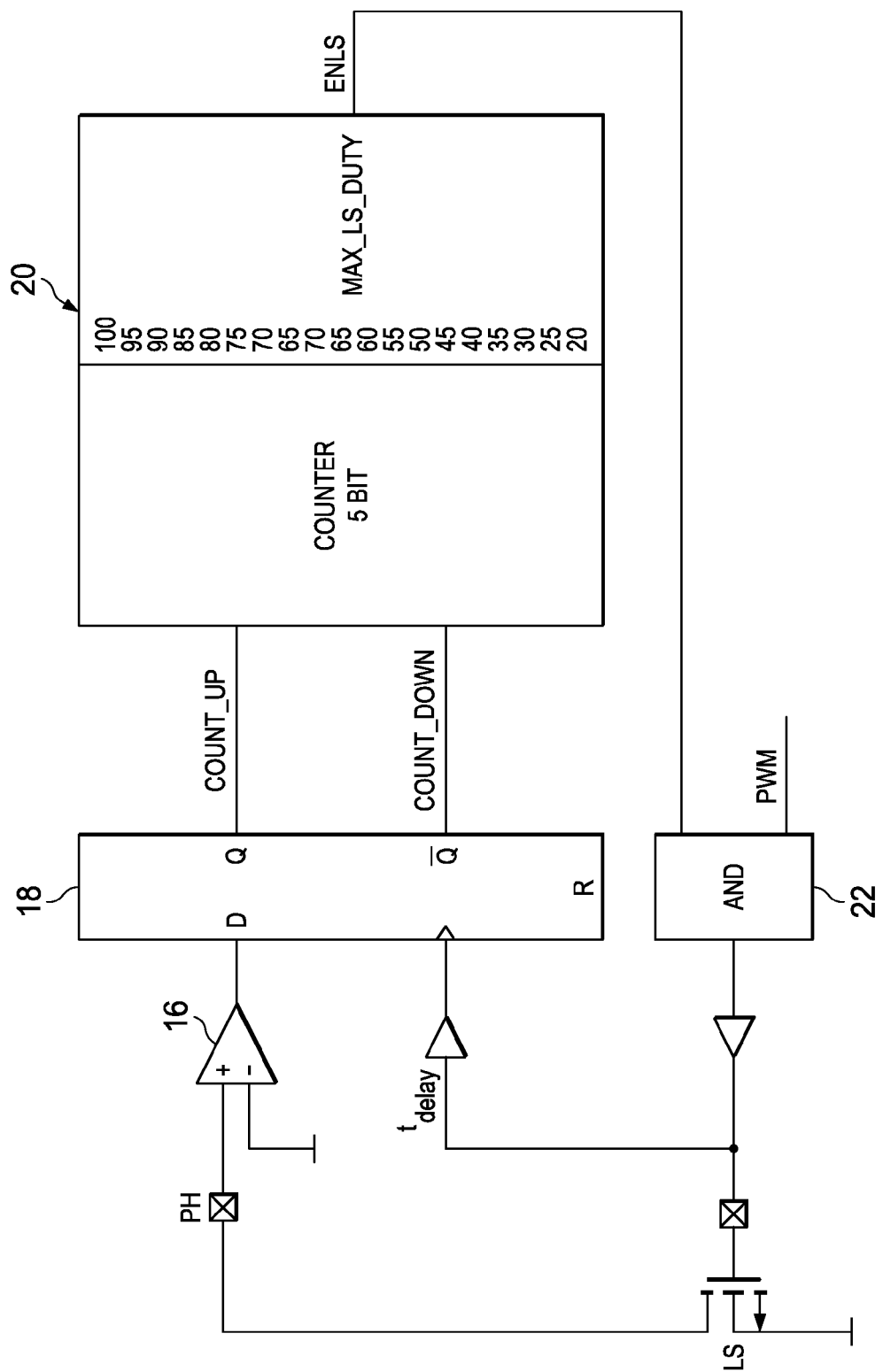
FIG. 3 is a block diagram of circuitry in the control circuit for determining the turn-off time of a low-side transistor in the converter.

In FIG. 3, it will be assumed for simplicity that a counter is used as a finite state machine which in response the COUNT_UP signal advances or delays the falling edge of the low-side gate drive signal. Further, in FIG. 3, the "helper" comparator of FIG. 2 is symbolized by operational amplifier 16, and a single flip-flop 18 represents the function of flip-flops FF1 and FF2 in FIG. 2. D-input of flip-flop 18 receives the output of comparator 16, the clock input of flip-flop 16 receives the delayed LS gate driver signal (tdelay), and the outputs of flip-flop 18 are applied to a 5-bit digital counter 20 as signals COUNT_UP and COUNT_DOWN. Accordingly, it is seen that in any event, counter 20 receives either a count up or a count down instruction (in other words, the finite state machine represented by the counter either increases or reduces the duration of the ON time of the low-side transistor in case of a buck converter and of the high-side transistor in case of a boost converter).

The output LS_ENABLE of counter 20 is an enable signal ENLS which is combined with the inverted PWM signal in AND gate 22. The current count in counter 20 is represented e.g. by a thermometer code between 100 and 20, as illustrated in FIG. 3. The scale of counter 20 corresponds to a maximum value MAX_LS_DUTY for the duty time of low-side transistor LS. A high ENLS signal occurs at a fraction (e.g. between 100 and 20) of the maximum value MAX_LS_DUTY. As a result, the turn-off edge of the gate drive signal forwarded to transistor LS is advanced with respect to the falling edge of the PWM signal whenever the count in counter 20 corresponds to less than the maximum value MAX_LS_DUTY.

Figure 4:
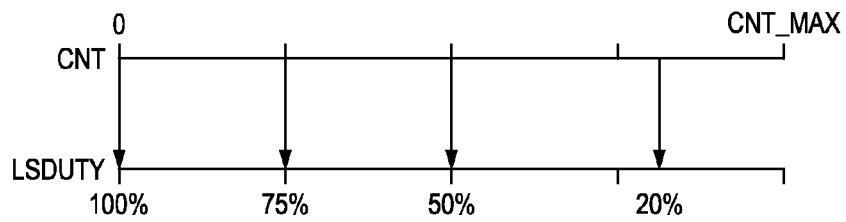
FIG. 4 illustrates the mapping of a counter count into a scale representing the percentage of duty time for the low-side gate driver signal.

The mapping of the counter 20 count into the range of duty time values for the ON time of the low-side gate driving signal, in terms of a percentage of the maximum value MAX_LS_DUTY, is shown in FIG. 4. In the diagram, line CNT is the counter 20 count from 0 to CNT_MAX, and line LSDUTY is the corresponding percentage of duty time for the low-side gate driving signal. A count 0 corresponds to 100% of duty time and a count close to CNT_MAX corresponds to 20% duty time (higher counts being irrelevant).

Figure 5:
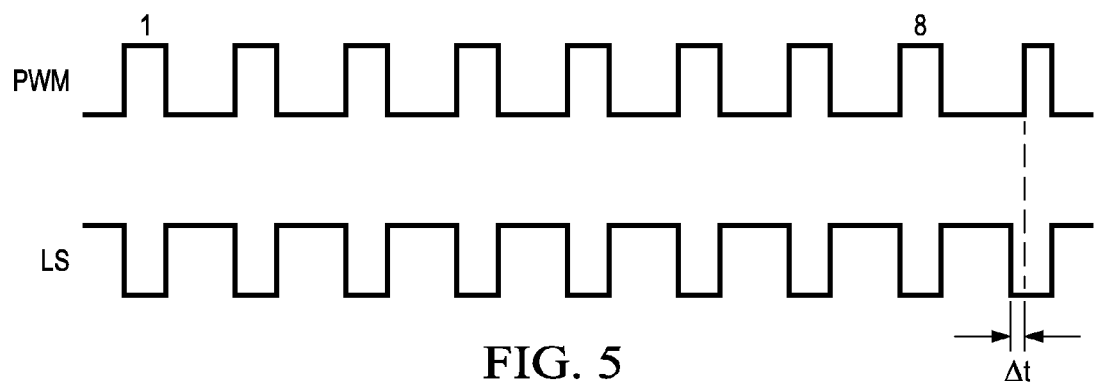
FIG. 5 illustrates a process where the ON time for the low-side gate driver signal is reduced by a predetermined amount after each n-th period of a PWM signal.

On power-up of the control circuit, counter 20 will be at minimum count and ENLS will occur at a moment corresponding to MAX_LS_DUTY. In other words, as illustrated in FIG. 5, the duration for the ON time of the low-side gate driving signal LS will substantially correspond to the duration on the "low" state of the PWM signal. However, whenever the count of counter 20 is at minimum, and every n-th period of the PWM signal, n being integer "8" in an example implementation, the turn-off edge of signal LS is advanced by a small fraction Δt which corresponds to a small fraction of the PWM period, as will be explained with reference to FIG. 6.

Figure 6:
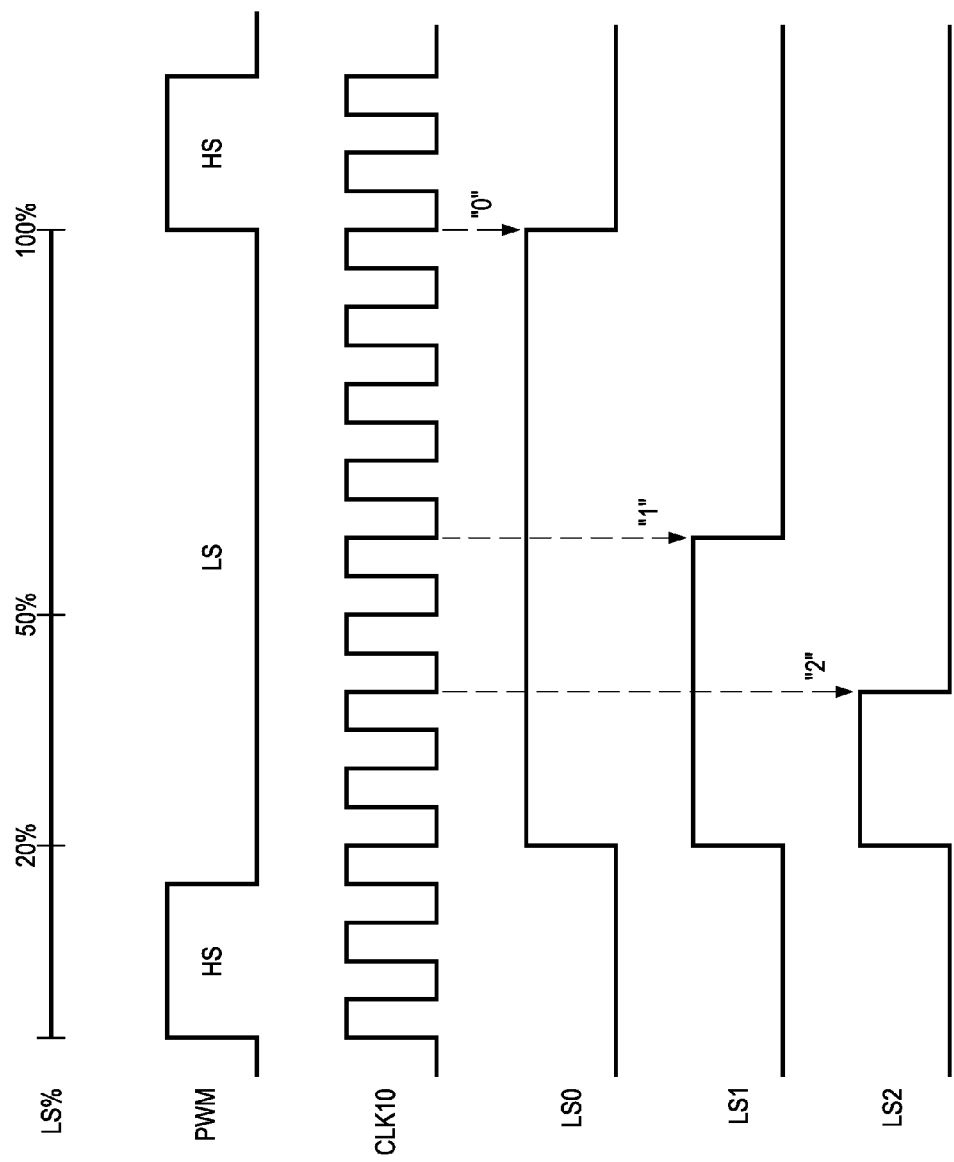
FIG. 6 illustrates different scenarios of ON times for the low-side gate driver signal.
Figure 7:
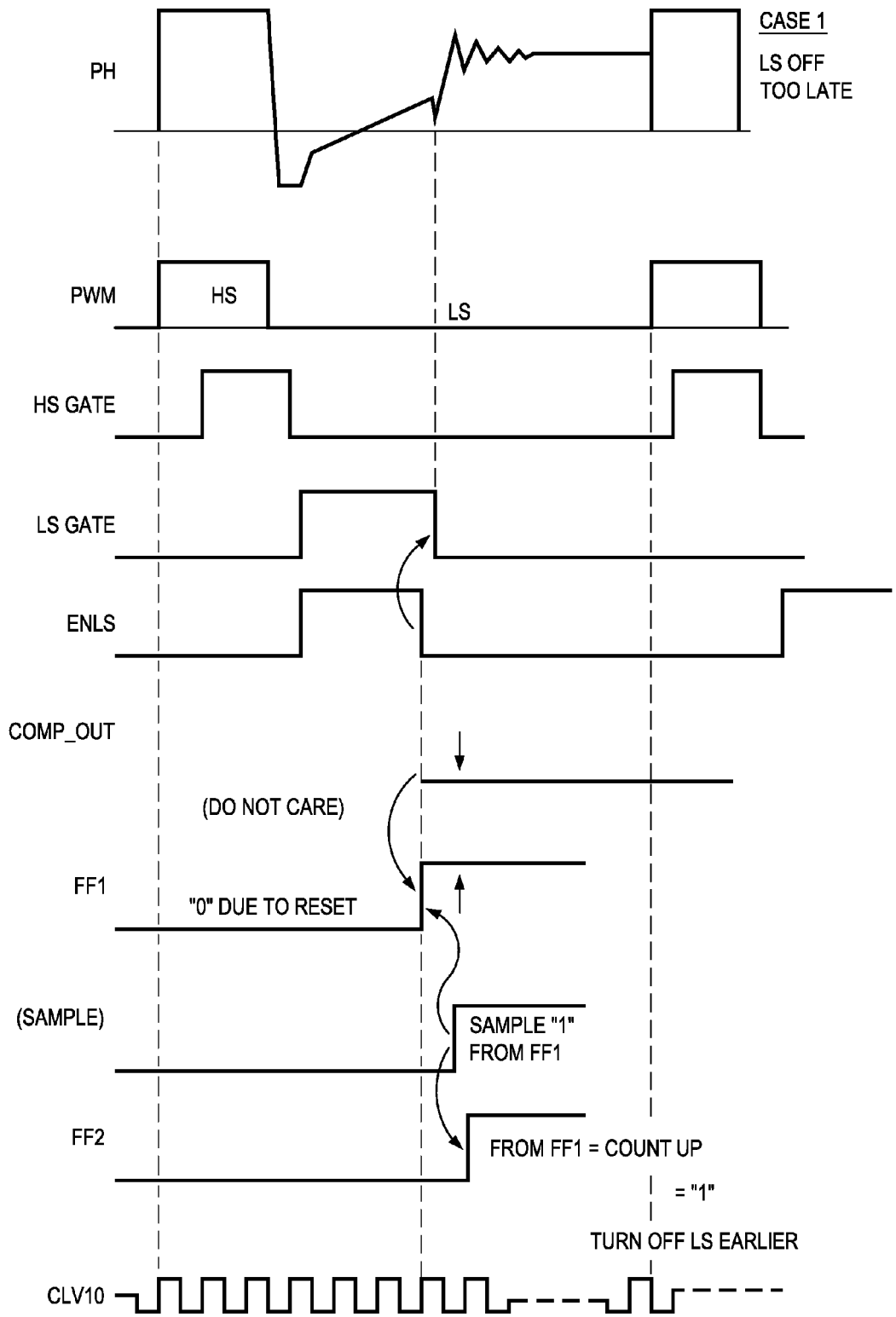
FIG. 7 is a signal diagram illustrating a case where the turn-off time is too late.

In FIG. 6, the signals are as follows:

LS %: the possible range of the low-side ON time up to 100% of the maximum value determined by the PWM signal PWM: the pulse width modulated control signal CLK10: a clock signal synchronized with the PWM signal at 10 times its frequency LS0: the low-side gate driving signal for the maximum ON time LS1: the low-side gate driving signal for "Case 1" in FIG. 7

Figure 8:
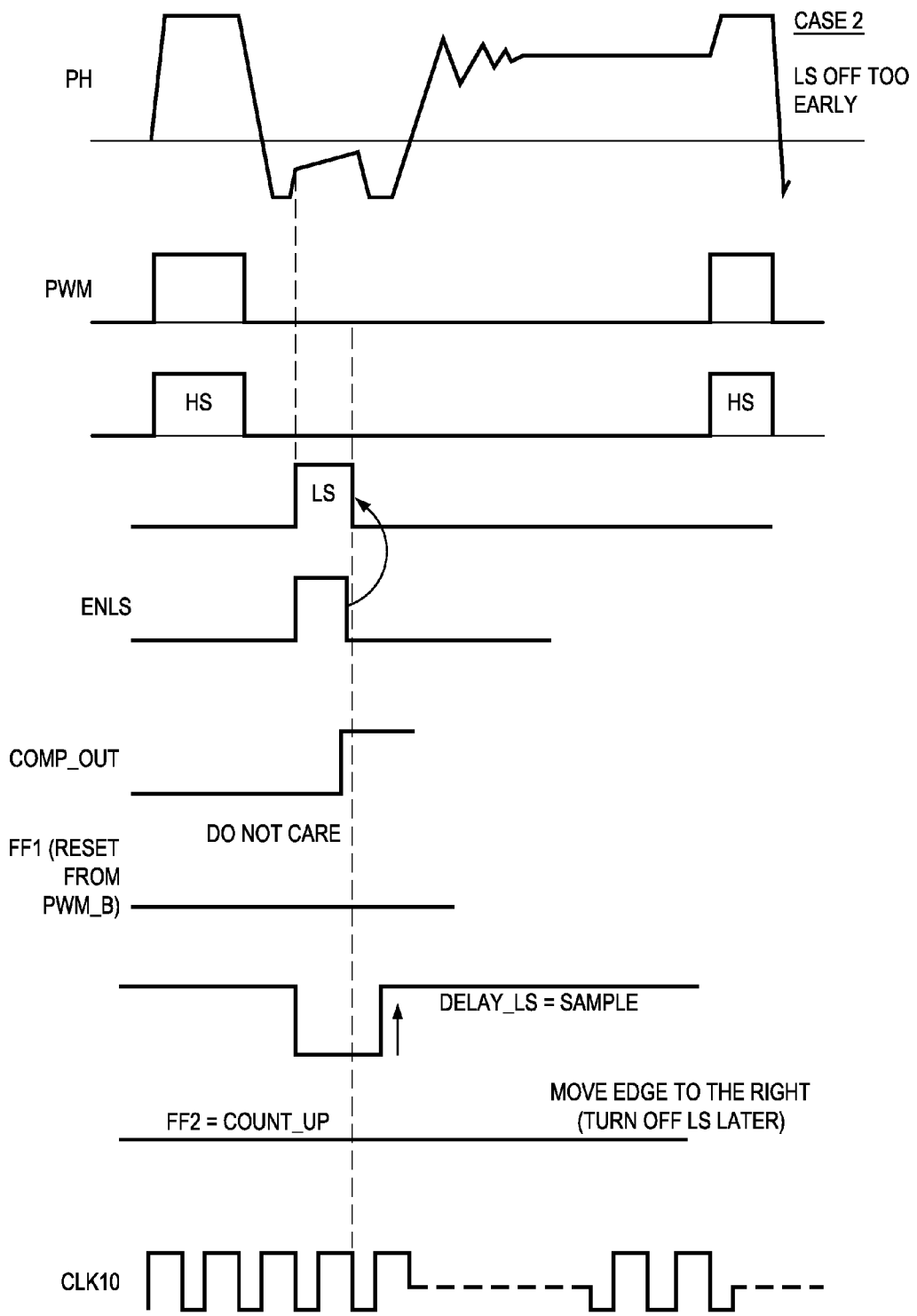
FIG. 8 is a signal diagram illustrating a case where the turn-off time is too early.

LS2: the low-side gate driving signal for "Case 2" in FIG. 8.

In FIG. 6, it is first assumed that the signal ZCROSS_ENABLE (if available) is high.

Signal LS % represents the mapping of the count of counter 20 into the useful range of the low-side ON time for transistor LS as illustrated in FIG. 4.

In signal PWS, each period is composed of a section HS where the high-side transistor HS is ON and a section LS where the low-side transistor LS may be ON, but the corresponding turn-off edge of the low-side gate driving signal will be determined as will be explained.

Signal CLK10 is a clock signal synchronized with the signal PWM and which, in the example shown, is at a frequency 10 times higher.

Signal LS0 is a low-side gate driving signal of a maximum duration as defined by the interval between two successive HS ON times, i.e. section LS in signal PWM. The rising edge of signal LS0 immediately follows a preceding HS ON time, and the turn-off time of signal LS0 corresponds to 100% of LS %, or CNT_MAX of count CNT. The falling edge of signal LS0 is triggered by an edge of clock signal CLK10, as indicated by arrow "0".

Signals LS1 and LS2 also have their rising edges immediately following a preceding HS ON time, but signal LS1 has a falling edge triggered by CLK10 at arrow "1" somewhere above 50% of LS %, and signal LS2 has a falling edge triggered by CLK10 at arrow "2" somewhere between 20% and 50% of LS %.

Signal LS0 corresponds to the start-up of the converter where the low-side gate driving time is at maximum. Starting form there, as illustrated in FIG. 5, the turn-off edge of signal LS is tentatively advanced by predetermined increments, the smallest possible increment being 5% of the maximum LS ON time as determined by the half-period of clock signal CKL10 in the exemplary implementation. After a number of such increments, the turn-off edge would be advanced to a point corresponding to signal LS1 in FIG. 6. This scenario will be analyzed more in detail with reference to FIG. 7.

FIGS. 7 and 8 illustrate the control circuit having reached a dynamic equilibrium in that it toggles between the conditions in both figures.

The signals in FIGS. 7 and 8 are as follows:
PH: the signal at the switch node PH
PWM: the pulse width modulated control signal
HSGATE: the gate driver signal for high-side transistor HS
LSGATE: the gate driver signal for low-side transistor LS
ENLS: the enable signal for the low-side gate driver signal
COMPOUT: the output of comparator HC
FF1: the output of flip-flop FF1
SAMPLE: the delayed output of FF1
FF2: the output of flip-flop FF2
CLK10: a clock signal synchronized with PWM at a 10 times higher frequency.

Turning now to FIG. 7, the switching node in each period of the signal PWM is connected to VIN by transistor HS during the HS ON time of signal PWM and connected to ground during the HS OFF time. Immediately following the turn-off edge of LSGATE, the comparator (16 in FIG. 3 or HC in FIG. 2) monitors the behavior of the switching node. In the assumption that the inductor current had undergone reversal in current direction, the signal PH sharply rises up, the comparator trips high, signal SAMPLE is high and flip-flop FF2 (FIG. 2) provides an active COUNT_UP signal to digital control circuitry 14. The increased count of counter 20 would then cause a further shift of the turn-off edge of LSGATE in a following period of PWM, and so on until a situation is reached as shown in FIG. 8.

In FIG. 8, the turn-off edge of signal LSGATE occurs before the inductor current had undergone reversal in current direction. Signal PH falls deeply negative (one diode voltage drop) so that the comparator trips low, signal SAMPLE is low and flip-flop FF2 (FIG. 2) provides an inactive COUNT_UP signal to digital control circuitry 14, corresponding in fact, and with reference to FIG. 3, to an active COUNT_DOWN signal applied to counter 20. The decreased count of counter 20 would then cause an opposite shift of the turn-off edge of LSGATE in a following period of PWM so that after one period or a few periods of PWM the situation illustrated in FIG. 7 is reached. The control circuit now toggles between the conditions in FIGS. 7 and 8 as long as the converter is in a low load current mode.

Figure 9:
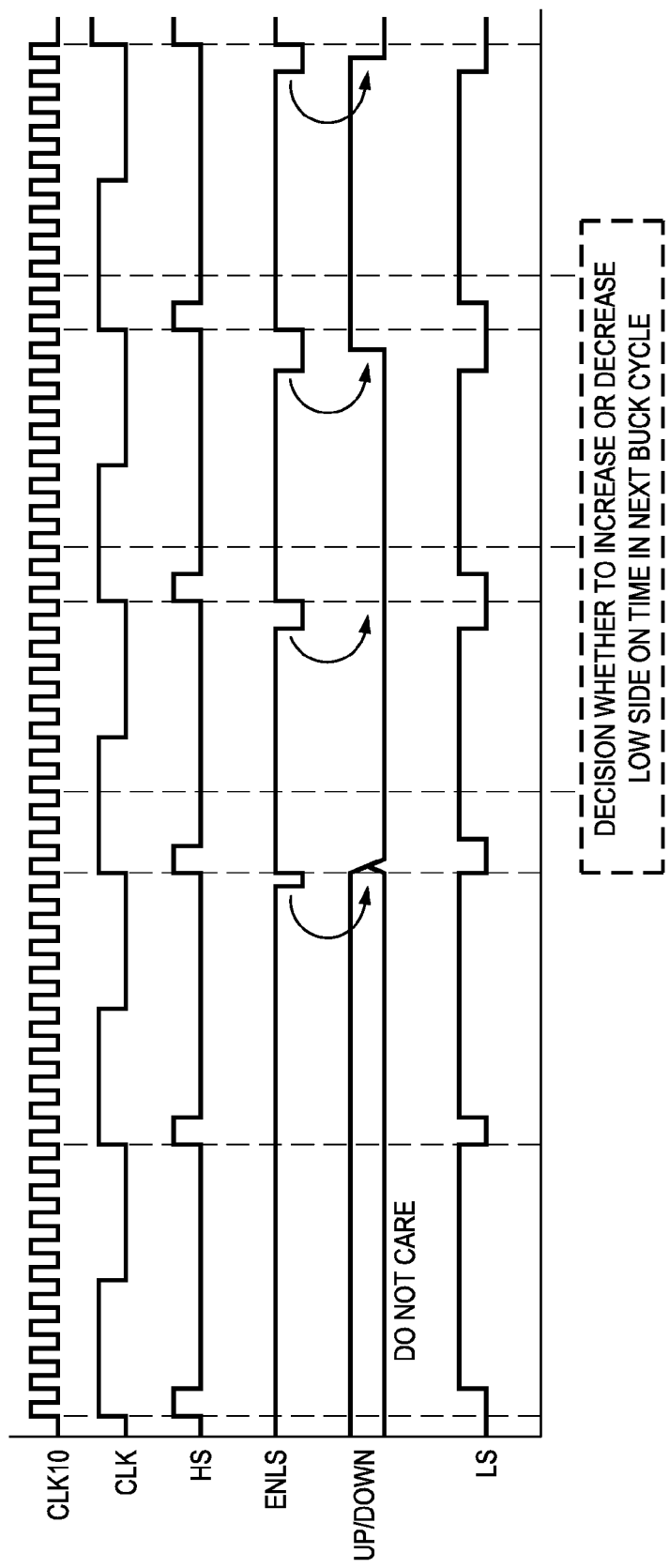
FIG. 9 is a signal diagram illustrating the timing of clock signals in relation to other relevant signal.

An easy way of synchronizing the system clock CLK10 with the gate drive signals is to derive the PWM signal from the system clock CLK10. For example, the system clock CLK10 could be 5 MHz, and the converter clock CLK for the PWM signal would be obtained by dividing the clock frequency by 10. It is the smallest time step for increasing or reducing the duration of the low-side ON period in case of a buck converter and of the high-side ON period in case of a boost converter, that determines the frequency ratio between CLK10 and CLK. With a ratio of 10 to 1 and making use of both the rising and the falling edges of CLK10, the smallest time step is 2 µs/20=100 ns. With these exemplary parameters, FIG. 9 illustrates the timing relationship of the clock signals CKL10 and CLK, and of the high-side and low-side gate drive signals HS and LS, in response to the ENLS and UP/DOWN signals.

Although the invention has been described in detail, it should be understood that various changes, substitutions and alterations can be made thereto without departing from the spirit and scope of the invention as defined by the appended claims.

The invention claimed is:

1. A DC-DC converter control circuit for controlling a high-side power transistor and a low-side power transistor connected in series between supply terminals to which an input supply voltage is applied, a converter switching node at the interconnection of the power transistors being adapted for connection of an inductor to which a load is connected, the control circuit comprising a feedback loop that provides a pulse width modulated control signal, logic circuitry to which the pulse width modulated control signal is applied and gate drivers with inputs connected to outputs of the logic circuitry and outputs applying gate drive signals to the gates of the power transistors; the control circuit further comprising:

a circuit for periodically providing a gate drive signal to turn off the low-side power transistor earlier than an end of a cycle;

digital detection circuitry operable when the gate drive signal for the low-side transistor is periodically turned off prior to the end of the cycle for providing a digital signal indicative of whether the converter switching node is at a potential above or below a zero reference at a time of a turn-off edge of the gate drive signals for the low-side power transistor; and adjusting circuitry controlled by the digital signal to advance or delay the turn-off edge of said gate drive signal for the low-side power transistor by a predetermined amount in response to the value of the digital signal, wherein the adjusting circuitry comprises a finite state machine which in response to the value of said digital signal advances or delays the turn-off edge of said gate drive signal.

2. The DC-DC converter control circuit in accordance with claim 1, wherein the digital detection circuitry comprises a transistor the gate of which is connected to the converter switching node and the drain of which provides a comparator output signal.

3. The DC-DC converter control circuit in accordance with claim 1, wherein the digital detection circuitry further comprises a first flip-flop for storing a fixed digital value in response to the occurrence of the comparator output signal and a second flip-flop which samples the output of the first flip-flop at a time just after the time of the turn-off edge of the gate drive signal, said digital signal being provided by an output of the second flip-flop.

4. The DC-DC converter control circuit in accordance with claim 1, wherein said gate drive signal is a low-side gate drive signal and the converter is a buck converter.

5. The DC-DC converter control circuit in accordance with claim 1, wherein said gate drive signal is a high-side gate drive signal and the converter is a boost converter.

6. The DC-DC converter control circuit in accordance with claim 2, wherein the adjusting circuitry comprises a finite state machine which in response to the value of said digital signal advances or delays the turn-off edge of said gate drive signal.

7. The DC-DC converter control circuit in accordance with claim 3, wherein said gate drive signal is a low-side gate drive signal and the converter is a buck converter.

8. The DC-DC converter control circuit in accordance with claim 2, wherein said gate drive signal is a low-side gate drive signal and the converter is a buck converter.

9. The DC-DC converter control circuit in accordance with claim 2, wherein said gate drive signal is a high-side gate drive signal and the converter is a boost converter.

10. The DC-DC converter control circuit in accordance with claim 3, wherein said gate drive signal is a high-side gate drive signal and the converter is a boost converter.

11. The DC-DC converter control circuit in accordance with claim 1, wherein said gate drive signal is a high-side gate drive signal and the converter is a boost converter.

12. A method of controlling a DC-DC converter with a control circuit for controlling a high-side power transistor and a low-side power transistor connected in series between supply terminals to which an input supply voltage is applied, a converter switching node at the interconnection of the power transistors being adapted for connection of an inductor to which a load is connected, the control circuit comprising a feedback loop that provides a pulse width modulated control signal, logic circuitry to which the pulse width modulated control signal is applied and gate drivers with inputs connected to outputs of the logic circuitry and outputs applying gate drive signals to the gates of the power transistors; the method comprising:
  a) periodically providing a gate drive signal to turn off the low-side power transistor earlier than an end of a cycle;
  b) operating digital detection circuitry when the gate drive signal for the low-side transistor is periodically turned off prior to the end of the cycle for providing a digital signal indicative of whether the converter switching node is at a potential above or below a zero reference at the time of the turn-off edge of the gate drive signals for the low-side power transistor; and
  c) advancing or delaying the turn-off edge of said gate drive signal for the low-side power transistor by a predetermined amount in response to the value of the digital signal by utilizing a finite state machine which in response to the value of said digital signal advances or delays the turn-off edge of said gate drive signal.

13. The method in accordance with claim 12, wherein said predetermined amount is a fraction of the period of the pulse width modulated control signal, said fraction being obtained as a period or half period of a clock generator running at a multiple of the frequency of the pulse width modulated control signal.

14. The method in accordance with claim 12, wherein a condition of low load current is detected and steps b) and c) are only performed subject to the detection of a low load current condition.

15. The method in accordance with claim 12, wherein the ON duration of said gate drive signal is initially set at the maximum duty duration determined by the pulse width modulated control signal, and whenever the ON duration of the gate drive signal is at the maximum duty duration determined by the pulse width modulated control signal, after every n-th period of the pulse width modulated control signal, n being an integer in a range up to several tens, the turn-off edge of the gate drive signal is advanced tentatively by the predetermined amount, and steps b) and c) are performed.

16. The method in accordance with claim 12, wherein the step of tentatively advancing the turn-off edge of the gate drive signal is repeated until a condition is reached where step b) alternately advances and delays the turn-off edge of the gate drive signal.

17. The method in accordance with claim 13, wherein a condition of low load current is detected and steps b) and c) are only performed subject to the detection of a low load current condition.

18. The method in accordance with claim 13, wherein the ON duration of said gate drive signal is initially set at the maximum duty duration determined by the pulse width modulated control signal, and whenever the ON duration of the gate drive signal is at the maximum duty duration determined by the pulse width modulated control signal, after every n-th period of the pulse width modulated control signal, n being an integer in a range up to several tens, the turn-off edge of the gate drive signal is advanced tentatively by the predetermined amount, and steps b) and c) are performed.

* * * * *